US009873818B2

(12) United States Patent
Tielemans et al.

(10) Patent No.: US 9,873,818 B2
(45) Date of Patent: *Jan. 23, 2018

(54) AQUEOUS RADIATION CURABLE POLYURETHANE COMPOSITIONS

(71) Applicant: Allnex Belgium S.A., Brussels (BE)

(72) Inventors: Michel Tielemans, Wemmel (BE); Dirk Bontinck, Ertvelde (BE); Jean-Claude Van Overvelt, Tournai (BE)

(73) Assignee: ALLNEX BELGIUM S.A., Drogenbos (BE)

( * ) Notice: Subject to any disclaimer, the term of this patent is extended or adjusted under 35 U.S.C. 154(b) by 0 days.

This patent is subject to a terminal disclaimer.

(21) Appl. No.: 14/737,866

(22) Filed: Jun. 12, 2015

(65) Prior Publication Data

US 2015/0275041 A1    Oct. 1, 2015

Related U.S. Application Data

(63) Continuation of application No. 12/225,874, filed as application No. PCT/EP2007/053109 on Mar. 30, 2007, now Pat. No. 9,085,655.

(30) Foreign Application Priority Data

Apr. 14, 2006  (EP) .................................... 06007921

(51) Int. Cl.
| | |
|---|---|
| C08G 18/34 | (2006.01) |
| C07C 229/02 | (2006.01) |
| C09D 175/16 | (2006.01) |
| C08G 18/08 | (2006.01) |
| C08G 18/67 | (2006.01) |
| C08G 18/68 | (2006.01) |
| C09D 175/14 | (2006.01) |
| C08J 3/28 | (2006.01) |
| B29C 64/124 | (2017.01) |
| C08L 75/16 | (2006.01) |
| B29K 23/00 | (2006.01) |
| B29K 69/00 | (2006.01) |
| B29K 75/00 | (2006.01) |

(52) U.S. Cl.
CPC .......... *C09D 175/16* (2013.01); *B29C 64/124* (2017.08); *C08G 18/0823* (2013.01); *C08G 18/673* (2013.01); *C08G 18/683* (2013.01); *C08J 3/28* (2013.01); *C09D 175/14* (2013.01); *B29K 2023/04* (2013.01); *B29K 2023/10* (2013.01); *B29K 2069/00* (2013.01); *B29K 2075/00* (2013.01); *C08J 2375/16* (2013.01); *C08L 75/16* (2013.01); *Y10T 428/31551* (2015.04); *Y10T 428/31554* (2015.04); *Y10T 428/31591* (2015.04); *Y10T 428/31598* (2015.04); *Y10T 428/31601* (2015.04); *Y10T 428/31605* (2015.04)

(58) Field of Classification Search
None
See application file for complete search history.

(56) References Cited

U.S. PATENT DOCUMENTS

| | | | |
|---|---|---|---|
| 5,336,716 | A | 8/1994 | Kappes et al. |
| 5,596,065 | A | 1/1997 | Gerlitz et al. |
| 5,990,192 | A | 11/1999 | Gerlitz et al. |
| 6,239,209 | B1 | 5/2001 | Yang et al. |
| 6,331,376 | B1 | 12/2001 | Kojima et al. |
| 7,033,706 | B2 | 4/2006 | Mori et al. |
| 2002/0156145 | A1* | 10/2002 | Van Den Berg ..... C08G 18/283 522/84 |
| 2004/0242763 | A1* | 12/2004 | Tielemans ......... C08G 18/0823 524/589 |
| 2006/0148980 | A1 | 7/2006 | Tielemans et al. |

FOREIGN PATENT DOCUMENTS

| | | |
|---|---|---|
| CA | 2463971 | 6/2003 |
| EP | 1 179 549 | 2/2002 |
| EP | 1 584 636 | 10/2005 |
| JP | H5-28241 | 4/1993 |

(Continued)

OTHER PUBLICATIONS

Third Party Observations issued May 15, 2014 in corresponding Japanese patent application No. 2009-504683 (with English translation).
JSR Technical Review No. 112/2005 cited in Third Party Observations issued May 15, 2014 in corresponding Japanese patent application No. 2009-504683 (with partial English translation).
English Abstract of JP H11-209448 A dated Aug. 1999.
English Abstract of EP 0181486 dated May 1986, which corresponds to JP H05-28241 B.

(Continued)

*Primary Examiner* — Jeffrey Washville
(74) *Attorney, Agent, or Firm* — Wenderoth, Lind & Ponack, L.L.P.

(57) ABSTRACT

The invention relates to radiation-curable aqueous composition comprising an (meth)acrylated polyurethane pre-polymer obtained from the reaction of a polyisocyanate, optionally a polyol, at least one hydrophilic compound containing at least one reactive group capable to react with isocyanate groups and which is capable to render the polyurethane pre-polymer dispersible in aqueous medium either directly or after the reaction with a neutralizing agent to provide a salt, an (meth)acrylated compound containing at least two reactive groups capable to react with isocyanate groups and an (meth)acrylated compound containing essentially one reactive group capable to react with isocyanate groups, said composition comprising an amount of (meth)acrylated and polymerizable ethylenically unsaturated groups of at least 3 meq per g.

21 Claims, No Drawings

(56) References Cited

FOREIGN PATENT DOCUMENTS

| JP | 9-279017 | 10/1997 |
| JP | 1999-209448 | 8/1999 |
| JP | 2003-40965 | 2/2003 |
| JP | 2003-147218 | 5/2003 |
| TW | 200505992 | 2/2005 |
| WO | 02/34808 | 5/2002 |
| WO | 2005/097864 | 10/2005 |
| WO | 2006/138557 | 12/2006 |

OTHER PUBLICATIONS

Translation of Third Party Observation filed May 31, 2013 in corresponding Japanese Application No. 2009-504683.

* cited by examiner

AQUEOUS RADIATION CURABLE POLYURETHANE COMPOSITIONS

The invention relates to aqueous radiation-curable polyurethane compositions especially suitable for making high scratch resistant coatings.

Radiation curable polyurethane dispersions are known since long to provide coatings for different substrates such as wood, plastics and metal which show a good mechanical and chemical resistance as well as some flexibility.

Ethylenically unsaturated polyurethanes have been made from the chain extension of isocyanate terminated ethylenically unsaturated polyurethane prepolymers with polyamines. The resulting polymers generally present a high molecular weight and contain hard urea segments that usually result in dispersions with a high minimum film formation temperature and hence require the use of coalescing aids. Ethylenically unsaturated polyurethanes can also be made from the end capping of an isocyanate terminated polyurethane prepolymer with an ethylenically unsaturated, especially (meth)acrylated monomer.

A drawback of these known radiation curable compositions is their limitation to provide high reactivity which makes them less suited for applications where high speed or low energy curing is required. Also they are less suitable for making pigmented coatings in which the presence of the pigments reduces the penetration of the UV light and limits a good curing in the bulk. These compositions generally do not permit to obtain coatings which present a high end hardness, scratch resistance and stain resistance.

We have now found radiation curable polyurethane dispersions which overcome these problems.

Therefore the present invention relates to an aqueous radiation-curable composition comprising
- at least one (meth)acrylated polyurethane pre-polymer (A) obtained from the reaction of at least one polyisocyanate compound (i), optionally at least one polyol (ii), at least one hydrophilic compound (iii) containing at least one reactive group capable to react with isocyanate groups and which is capable to render the polyurethane pre-polymer dispersible in aqueous medium either directly or after the reaction with a neutralizing agent to provide a salt, at least one (meth)acrylated compound (iv) containing at least two reactive groups capable to react with isocyanate groups, at least one (meth)acrylated compound (v) containing essentially one reactive group capable to react with isocyanate groups; and
- optionally, at least one ethylenically unsaturated compound (B), wherein said composition comprises a total amount of (meth)acrylated and, optionally, polymerizable ethylenically unsaturated groups of at least 3 meq per total weight in g of (i), (ii), (iii), (iv), (v) and (B).

By polymerizable ethylenically unsaturated groups is meant to designate in the present invention carbon-carbon double bonds which under the influence of irradiation and/or a (photo)initiator can undergo radical polymerization. The polymerizable ethylenically unsaturated groups are generally chosen from (meth)acrylic and allylic groups, preferably (meth)acrylic groups, most preferably acrylic groups. In the present invention, the term "(meth)acryl" is to be understood as to encompass both acryl and methacryl compounds or derivatives as well as mixtures thereof.

The compositions according to the invention are characterized by a high level of (meth)acrylated and, optionally, polymerisable ethylenically unsaturated groups; they contain at least 3 meq of (meth)acrylated and, optionally, polymerisable ethylenically unsaturated groups per total weight in g of compounds (i), (ii), (iii), (iv), (v) and (B). The amount of (meth)acrylated and ethylenically unsaturated groups is usually measured by nuclear magnetic resonance spectroscopy and is expressed in meq per g of solid material. A sample of the composition is dried for 1 day at room temperature and 12 h at 60° C. and then dissolved in N-methylpyrolidinone. The sample is submitted to 1H-NMR analysis in order to measure the molar concentration of (meth)acrylated and ethylenically unsaturated groups using 1,3,5-bromobenzene as internal standard. The comparison between the peak assigned to aromatic protons of the internal standard and the peaks assigned to the (meth)acrylated and ethylenically unsaturated double bonds allow to calculate the molar concentration of (meth)acrylated and ethylenically unsaturated groups according to the formula $(A \times B)/C$ wherein A is the integration of 1H double bonds provided by the sample, B is the number of moles of the internal standard in the sample and C is the integration of 1H provided by the internal standard. Alternatively, the amount of (meth)acrylated and ethylenically unsaturated groups can also be measured by a titration method following the addition of an excess of pyridinium sulfate dibromide on said unsaturated groups (within glacial acetic acid as solvent and mercury acetate as catalyst). Said excess liberates iodine in the presence of potassium iodide and the iodine is then titrated with sodium thiosulfate.

Preferably the total amount of (meth)acrylated and polymerisable ethylenically unsaturated groups is at least 3.5 meq, especially at least 4 meq of (meth)acrylated and polymerisable ethylenically unsaturated groups per total weight in g of compounds (i), (ii), (iii), (iv), (v) and (B).

Preferably the total amount of (meth)acrylated and polymerisable ethylenically unsaturated groups does not exceed 10 meq of (meth)acrylated and polymerisable ethylenically unsaturated groups per total weight in g of compounds (i), (ii), (iii), (iv), (v) and (B).

The radiation curable composition is preferably obtained by a process comprising
- a first step comprising the reaction of compounds (i), (iii) and (iv), and optionally compound (ii),
- a second step, comprising the reaction of the product of the first step with a compound (v) so that an end-capped (meth)acrylated polyurethane pre-polymer is obtained;
- the dispersion in an aqueous medium of said end-capped (meth)acrylated polyurethane pre-polymer obtained after the second step,
- an optional step comprising the reaction with a neutralizing agent in order to convert the hydrophilic groups provided by compound (iii) into anionic salts,
- an optional step wherein the (meth)acrylated polyurethane pre-polymer obtained after the second step is reacted with a chain extender (vii),
- optionally the addition of an ethylenically unsaturated compound (B).

This process can be carried out by reacting a stoechiometric excess of compound (i) with compounds (ii), (iii) and (iv), preferably under substantially anhydrous conditions and at a temperature between 30° C. and 130° C., more preferably between 70° C. and 100° C., until the reaction between the isocyanate groups and the isocyanate-reactive groups is substantially complete. The isocyanate content can be followed by titration with an amine. The reactants are generally used in proportions corresponding to an equivalent ratio of isocyanate groups provided by compound (i) to isocyanate-reactive groups provided by compounds (ii), (iii) and (iv) of from about 1.1:1 to about 2:1, preferably from about 1.4:1 to 1.8:1. The reaction may be facilitated by the addition of 5 to 40%, preferably 15 to 25%, by weight of a solvent in order to reduce the viscosity of the pre-polymer. The solvent is preferably acetone or methylethylketone. During this process, it is common to use catalysts to accelerate the reaction of the isocyanates towards hydroxyls and to use inhibitors in order to prevent the radical reaction of the reactive unsaturations. It is possible in the frame of this invention to use a sequential process during which compound (i) and/or compounds (ii), (iii) and/or (iv) are added incrementally in two or several portions, or with a continuous feed. The reason for this is a better control on the exothermicity of the reaction, especially when no solvent is present.

The compounds (ii), (iii) and (iv) are preferably used in a molar ratio (ii) (iii) (iv) of 1:1:1 to 1:10:10, more preferably from 1:1:1 to 1:5:5.

In a subsequent step, the isocyanate-terminated polyurethane pre-polymer is reacted with compound (v), preferably in the same conditions as for the previous step. The reactants are generally used in proportions corresponding to an equivalent ratio of isocyanate groups provided by the pre-polymer obtained in the first step to isocyanate-reactive groups provided by compound (v) of from about 2:1 to 1:1, preferably from about 1.7:1 to 1.25:1. The isocyanate content can be followed by titration with an amine.

In general, the pre-polymer obtained after the reaction of (i), (ii), (iii), (iv) and (v) is dispersed in an aqueous medium by adding the pre-polymer slowly into water or reversely by adding water to the pre-polymer. Usually this dispersion proceeds under high sheer mixing. Usually the dispersion requires the preliminary neutralization of the hydrophilic groups provided by compound (iii), such as the carboxylic acid or sulfonic acid groups into anionic salts. This is generally done by adding an organic or inorganic neutralizing agent to the pre-polymer or the water. Suitable neutralizing agents include ammonia, volatile organic tertiary amines such as trimethylamine, triethylamine, triisopropylamine, tributylamine, N,N-dimethylcyclohexylamine, N,N-dimethylaniline, N-methylmorpholine, N-methylpiperazine, N-methylpyrrolidine and N-methylpiperidine and non-volatile inorganic bases comprising monovalent metal cations, preferably alkali metals such as lithium, sodium and potassium and anions such as hydroxides, hydrides, carbonates and bicarbonates. Preferred are triethylamine and sodium hydroxide.

The total amount of these neutralizing agents can be calculated according to the total amount of acid groups to be neutralized. Generally a stoechiometric ratio of about 1:1 is used.

In general, the relative quantities of compounds (i), (ii), (iii), (iv) and (v) are such that a stoechiometric excess of compound (i) to compounds (ii), (iii), (iv) and (v) is used so that a fraction of isocyanate functional (meth)acrylated polyurethane pre-polymer is obtained, that is a pre-polymer comprising still some residual isocyanate groups. This isocyanate functional pre-polymer fraction can then be chain-extended with an active hydrogen-containing chain extender in the aqueous phase, generally at a temperature between 5 and 90° C., preferably of 15 to 30° C. Water can act as chain extender. Optionally, a further compound (vii) is added comprising active amino groups capable of making a chain extension of the remaining isocyanate end-groups of the pre-polymer. The chain extender is suitably a water-soluble aliphatic, alicyclic, aromatic or heterocyclic primary or secondary polyamine or hydrazine having up to 60, preferably up to 12 carbon atoms. The total amount of compound (vii) used is generally calculated according to the amount of residual isocyanate groups present in the polyurethane prepolymer. The ratio of isocyanate groups in the prepolymer to the amine groups in the chain extender (vii) during the chain extension is generally in the range of from about 1:0.7 to about 1:1, preferably from about 1:0.9 to about 1:1 on an equivalent basis. This ratio is more preferably 1:1 in order to obtain a fully reacted polyurethane polymer with no residual free isocyanate groups.

The polyamine used has preferably an average functionality of 2 to 4, more preferably 2 to 3. Examples of such chain extenders (vii) useful herein comprise hydrazine, ethylene diamine, piperazine, 1,4-butanediamine, 1,6-hexanediamine, 1,8-octanediamine, 1,10-decanediamine, 1,12-dodecanediamine, 2-methylpentamethylenediamine, triethylene triamine, isophorone diamine (or 1-amino3-aminomethyl-3,5,5-trimethyl-cyclohexane), bis(4-aminocyclohexyl)methane, bis(4-amino-3-methylcyclohexyl)methane, polyethylene amines, polyoxyethylene amines and polyoxypropylene amines (e.g. Jeffamines from TEXACO), as well as mixtures thereof.

Preferably no chain extender compound (vii) is used.

In general, after the formation of the dispersion of the pre-polymer and when it contains a volatile solvent with a boiling point of below 100° C., the polymer dispersion is stripped. This is usually done under reduced pressure and at a temperature between 20 and 90° C., preferably 40 to 60° C.

By polyisocyanate compound (i) is meant to designate organic compounds comprising at least two isocyanate groups. The polyisocyanate compound usually comprises not more than three isocyanate groups. The polyisocyanate compound (i) is most preferably a di-isocyanate.

The polyisocyanate compound is generally selected from aliphatic, cycloaliphatic, aromatic and/or heterocyclic polyisocyanates or combinations thereof.

Examples of aliphatic and cycloaliphatic polyisocyanates are 1,6-diisocyanatohexane (HDI), 1,1'-methyl ene bis[4-isocyanatocyclohexane] (H12MDI), 5-isocyanato-1-isocyanatomethyl-1,3,3-trimethylcyclohexane (isophorone diisocyanate, IPDI). Aliphatic polyisocyanates containing more than two isocyanate groups are for example the derivatives of above mentioned diisocyanates like 1,6-diisocyanatohexane biuret and isocyanurate.

Examples of aromatic polyisocyanates are 1,4-diisocyanatobenzene (BDI), 2,4-diisocyanatotoluene (TDI), 1,1'-methylenebis[4-isocyanatobenzene] (MDI), xylilene diisocyanate (XDI), tetramethylxylilene diisocyanate (TMXDI), 1,5-naphtalene diisocyanate (NDI), tolidine diisocyanate (TODI) and p-phenylene diisocyanate (PPDI). The polyisocyanate is preferably selected from aliphatic and cycloaliphatic polyisocyanates, more preferably diisocyanates. Especially preferred is 1,1'-methylene bis[4-isocyanatocyclohexane].

The amount of polyisocyanate compound (i) used for the synthesis of the polyurethane prepolymer (A) is generally in the range of from 10 to 60 wt % of the polyurethane prepolymer (A), preferably from 20 to 50 wt % and more preferably from 30 to 40 wt %.

By polyol (ii) is meant to designate a polyol comprising at least two hydroxyl groups. The polyol (ii) can be selected from high molecular weight polyols having a number average molecular weight of at least 400, low molecular weight polyols having a number average weight of lower than 400 or any mixtures thereof. The high molecular weight polyol (ii) preferably has a number average molecular weight which does not exceed 5000, preferably not 2000, more preferably not 1000.

Examples of such high molecular weight polyols are polyester polyols, polyether polyols, polycarbonate polyols, fatty dimer diols, polybutadiene polyols, silicone polyols and polyacrylate polyols, as well as combinations thereof.

Suitable polyether polyols comprise polyethylene glycols, polypropylene glycols and polytetramethylene glycols, or bloc copolymers thereof.

Suitable polycarbonate polyols include the reaction products of diols such as ethylene glycol, 1,3-propanediol, 1,3-butanediol, 1,4-butanediol, 1,5-pentanediol, 1,6-hexanediol, diethylene glycol, triethylene glycol, dipropylene glycol, tripropylene glycol or tetraethylene glycol with phosgene, with dialkylcarbonates such as dimethycarbonate, with diarylcarbonates such as diphenylcarbonate or with cyclic carbonates such as ethylene and/or propylene carbonate.

Suitable fatty dimer diols are obtained from the hydrogenation of dimer acids, preferably those comprising 36 carbon atoms.

Suitable polyacrylate polyols include those prepared by the radical polymerization of (meth)acrylic and/or (meth) acrylamide monomers initiated by a thermal radical initiator in the presence of an hydroxylated mercaptan and followed by the end-group transesterification with a short chain diol, such as 1,4-butanediol.

Preferred are polyester, polyether and polycarbonate polyols.

Polyester polyols are particularly preferred, especially the hydroxyl terminated reaction products of polyhydric, preferably dihydric, alcohols with polycarboxylic, preferably dicarboxylic, acids or their corresponding anhydrides, as well as those obtained from the ring opening polymerization of lactones. The polycarboxylic acids which may be used for the formation of these polyester polyols may be aliphatic, cycloaliphatic, aromatic and/or heterocyclic and they may be substituted, saturated or unsaturated. Examples of dicarboxylic acids are succinic acid, glutaric acid, adipic acid, suberic acid, azelaic acid, sebacic acid, dodecanedicarboxylic acid, hexahydrophthalic acid, isophthalic acid, terephthalic acid, ortho-phthalic acid, tetrachlorophthalic acids, 1,5-naphthalenedicarboxylic acid, fumaric acid, maleic acid, itaconic acid, citraconic acid, mesaconic acid, tetrahydrophthalic acid, trimellitic acid, trimesic acid and pyromellitic acid, or mixtures thereof. The polyester polyol may also contain an air-drying component such as a long chain unsaturated aliphatic acid, especially a fatty acid dimer. The polyhydric alcohols which are preferably used for the preparation of the polyester polyols include ethylene glycol, propylene glycol, 1,3-propanediol, 1,3-butanediol, 1,4-butanediol, 1,5-pentanediol, 1,6-hexanediol, neopentyl glycol, diethylene glycol, dipropylene glycol, triethylene glycol, tetraethylene glycol, dibutylene glycol, 2-methyl-1, 3-pentanediol, 2,2,4-trimethyl-1,3-pentanediol, 1,4-cyclohexanedimethanol, ethylene oxide adducts or propylene oxide adducts of bisphenol A or hydrogenated bisphenol A. Polyols such as glycerin, trimethylolethane, trimethylolpropane, di-trimethylolethane, di-trimethylolpropane and pentaerythritol may also be used.

Particularly preferred are polyester polyols made from the polycondensation of neopentylglycol and adipic acid and/or isophthalic acid.

The total amount of polyol (ii) in the polyurethane pre-polymer (A) is preferably of from 2 to 50% by weight of the polyurethane prepolymer (A), more preferably of from 3 to 30% by weight, most preferably of from 5 to 15% by weight.

Examples of low molecular weight polyols are ethyleneglycol, diethyleneglycol, propyleneglycol, dipropyleneglycol, neopentyl glycol, 1,3-propane diol, 2-ethyl-2-butyl-1,3-propanediol, 1,3-butanediol, 1,4-butanediol, 1,5-pentariediol, 1,6-hexanediol, 1,7-heptanediol, 1,8-octanediol, 2-ethyl-1,6-hexanediol, cyclohexane dimethanol, trimethylolpropane, di-trimethylol propane, glycerol, pentaerythritol and di-pentaerythritol.

According to specific embodiment of the invention, a high molecular weight polyol is used in the preparation of the prepolymer (A).

According to another specific embodiment of the invention, a mixture of high molecular weight polyols and low molecular weight polyols is used.

The hydrophilic compound (iii) is generally a polyol comprising a functional group that can exhibit an ionic or non-ionic hydrophilic nature. Preferably it is a polyol containing one or more anionic salt groups, such as a carboxylate and sulfonate salt groups or acid groups which may be converted to an anionic salt group, such as carboxylic acid or sulfonic acid groups. Preferred are hydroxycarboxylic acids represented by the general formula $(HO)_xR(COOH)_y$, wherein R represents a straight or branched hydrocarbon residue having 1 to 12 carbon atoms, and x and y independently are integers from 1 to 3. Examples of these hydroxycarboxylic acids include citric acid, malic acid, lactic acid and tartaric acid. The most preferred hydroxycarboxylic acids are the α,α-dimethylolalkanoic acids, wherein x=2 and y=1 in the above general formula, such as for example, 2,2-dimethylolpropionic acid and 2,2-dimethylolbutanoic acid.

The amount hydrophilic compound (iii) generally is from 1 to 25% by weight of the polyurethane pre-polymer (A), preferably of from 4 to 10% by weight.

By (meth)acrylated compound (iv) containing at least two reactive groups capable to react with isocyanate groups and at least one (meth)acrylated group is meant to designate in the present invention compounds comprising at least one (meth)acrylated function such as acrylic or methacrylic group and at least two nucleophilic functions capable of reacting with isocyanate, preferably hydroxyl functions.

Preferred are (meth)acryloyl dihydroxy compounds and poly(meth)acryloyl dihydroxy compounds.

Compounds (iv) comprising two hydroxyl functions and at least two (meth)acrylate functions are preferred. Acrylates are particularly preferred.

Particularly preferred compounds (iv) are those obtained from the reaction of diglycidyl compounds with (meth) acrylic acid.

Aliphatic diglycidyl compounds derived from alpha, omega diols having 4 to 12 carbon to atoms or from polyoxyalkylenediols, especially polyethylene glycol, polypropylene glycol or mixtures thereof that contain oxyalkylene groups, can be used. Preference is given, for example, to 1,4-butanediol diglycidyl ether, 1,6-hexanediol diglycidyl ether, cyclohexanedimethanol diglycidyl ether, polyethylene glycol diglycidyl ether, polypropylene glycol diglycidyl ether, hydrogenated bisphenol A diglycidyl ether and hydrogenated bisphenol F diglycidyl ether and their ethoxylated and/or propoxylated equivalents. It is also possible to employ diglycidyl esters, such as diglycidyl hexahydrophthalate. Aromatic diglycidyl compounds derived from bisphenol A and bisphenol F are preferred. Particularly preferred are bisphenol A diglycidyl ether, bisphenol F diglycidyl ether and their ethoxylated and/or propoxylated equivalents. It is also possible to employ diglycidyl esters, such as diglycidyl phthalate, N,N-diglycidyl aniline, N,N- diglycidyl-4-glycidyloxyaniline. Especially preferred is the diacrylate ester of bisphenol A diglycidylether.

Compounds (iv) obtained from partial esterification of aliphatic or aromatic polyhydric polyols with (meth)acrylic acid and having a residual average hydroxyl functionality of at least 2.0 in the molecule, can also be used. In this context, it is also possible to use the reaction products of such polyols with ethylene oxide and/or propylene oxide or mixtures thereof, or reaction products of such polyols with lactones, which add to these polyols in a ring-opening reaction. Examples of suitable lactones are γ-butyrolactone and, in particular δ-valerolactone and ε-caprolactone. Preferred are those alkoxylated polyols having not more than two alkoxy groups per hydroxyl functionality and ε-caprolactone-modified polyols. It is known to those skilled in the art that the (meth)acrylation of polyols such as glycerol, trimethylolpropane, pentaerythritol, di-trimethylolpropane or di-pentaerythritol proceeds to a mixture of mono-, di-, tri-, tetra-, penta- and hexa(meth)acrylate and that a possible way to characterize the mixture is by measuring its hydroxyl value. Examples are glycerol mono-(meth)acrylate, trimethylolpropane mono-(meth)acrylate, pentaerythritol di-(meth)acrylate, di-trimethylolpropane di-(meth)acrylate, di-pentaerythritol tetra-(meth)acrylate and their polyethoxylated and/or polypropoxylated equivalents.

Compounds (iv) obtained from the hydrolysis of aliphatic, cycloaliphatic or aromatic compounds bearing an epoxy functionality together with at least one (meth)acrylic functionality can be used as well. Particularly suitable are the products resulting from the hydrolysis of glycidyl(meth)acrylate, i.e. 1,2-dihydroxy-3-(meth)acryloyl-propane. The amount of compound (iv) generally is from 5 to 30% by weight of the polyurethane prepolymer (A), preferably of from 10 to 20% by weight.

By (meth)acrylated compound (v) containing essentially one reactive group capable to react with isocyanate groups is meant to designate in the present invention compounds comprising at least one unsaturated function such as acrylic or methacrylic group and one nucleophilic function capable of reacting with isocyanate, preferably an hydroxyl group. Preferred are (meth)acryloyl mono-hydroxy compounds, more particularly poly(meth)acryloyl mono-hydroxy compounds. Acrylates are particularly preferred. Useful compounds (v) include the esterification products of aliphatic and/or aromatic polyols with (meth)acrylic acid having a residual average hydroxyl functionality of about 1. The partial esterification products of (meth)acrylic acid with tri-, tetra-, penta- or hexahydric polyols or mixtures thereof are preferred. In this context, it is also possible to use reaction products of such polyols with ethylene oxide and/or propylene oxide or mixtures thereof, or reaction products of such polyols with lactones, which add to these polyols in a ring-opening reaction. Examples of suitable lactones are γ-butyrolactone and, in particular δ-valerolactone and ε-caprolactone. These modified or unmodified polyols are partly esterified with acrylic acid, methacrylic acid or mixtures thereof until the desired residual hydroxyl functionality is reached.

Compounds (v) obtained from the reaction of (meth)acrylic acid with aliphatic, cycloaliphatic or aromatic compounds bearing an epoxy functionality together with at least one (meth)acrylic functionality can be used as well.

Other suitable compounds are the (meth)acrylic esters with linear and branched polyols in which at least one hydroxy functionality remains free, like hydroxyalkyl(meth)acrylates having 1 to 20 carbon atoms in the alkyl group. Preferred molecules in this category are hydroxyethyl(meth)acrylate, hydroxypropyl(meth)acrylate, hydroxybutyl(meth)acrylate. Particularly preferred are compounds comprising at least two (meth)acryl functions such as glycerol diacrylate, trimethylolpropane diacrylate, glycerol diacrylate, pentaerythritol triacrylate, ditrimethylolpropane triacrylate, dipentaerythritol pentaacrylate and their (poly)ethoxylated and/or (poly)propoxylated equivalents.

The amount of compound (v) generally is from 10 to 60% by weight of the polyurethane prepolymer (A), preferably of from 30 to 50% by weight.

Preferably the total amount of (meth)acrylated groups in the pre-polymer (A) is at least 3.0 meq, especially at least 3.5 meq of (meth)acrylated groups per total weight in g of compounds (i), (ii), (iii), (iv) and (v).

Preferably the total amount of (meth)acrylated groups does not exceed 10 meq of (meth)acrylated groups per total weight in g of compounds (i), (ii), (iii), (iv) and (v). The composition according to the invention preferably comprises at least one ethylenically unsaturated compound (B), that is a compound comprising at least one unsaturated function such as an acrylic, methacrylic or allylic group, more particularly a (poly)(meth)acryloyl-containing compound. Acrylates are preferred.

The ethylenically unsaturated compound (B) can be selected from the (meth)acrylated compounds (iv) and (v) as described here above or can be an ethylenically unsaturated compound which comprises no functionality which is capable to react with an isocyanate group.

The compound (B) is preferably selected from (meth)acrylated compounds (v) and from ethylenically unsaturated compounds comprising no functionality which is capable to react with an isocyanate group.

Aliphatic and aromatic polyhydric polyols which have been totally esterified with (meth)acrylic acid and contain substantially no residual hydroxyl functionality in the molecule are particularly preferred. Suitable are the esterification products of (meth)acrylic acid with tri-, tetra-, penta- and/or hexahydric polyols and mixtures thereof. In this context, it is also possible to use reaction products of such polyols with ethylene oxide and/or propylene oxide or mixtures thereof, or reaction products of such polyols with lactones, which add to these polyols in a ring-opening reaction. Examples of suitable lactones are γ-butyrolactone and, in particular δ-valerolactone and ε-caprolactone. Compounds employed with preference are alkoxylated polyols having no more than two alkoxy groups per hydroxyl functionality, and ε-caprolactone-modified polyols. These modified or unmodified polyols are preferably totally esterified with acrylic acid, methacrylic acid or mixtures thereof until substantially no residual hydroxyl functionality remains. Examples of poly-unsaturated compounds from this category are trimethylolpropane tri-acrylate, glycerol tri-acrylate, pentaerythritol tetra-acrylate, di-trimethylolpropane tetra-acrylate, di-pentaerythritol hexa-acrylate and their (poly)ethoxylated and/or (poly)propoxylated equivalents, as well as mixtures thereof. It is also possible to use any compound from the category of urethane(meth)acrylates, epoxy(meth)acrylates, polyester(meth)acrylates and (meth)acrylic(meth)acrylates or mixtures thereof.

The compound (B) can also be an ethylenically unsaturated compound bearing one or more additional functional groups or side-chains providing additional properties to the polymer. Siliconated and/or fluorinated ethylenically unsaturated compounds such as the products commercialized under the names of 1RR 154 and ADDITOL®HGX83 are particularly suitable.

The amount of ethylenically unsaturated compound (B) used is generally between 5 and 50% by weight, preferably between 20 and 30% by weight of compound (B) to the total amount of pre-polymer (A).

The present invention also relates to a process for the preparation of a radiation-curable compositions such as described here above, said process comprising
- a first step comprising the reaction of compounds (i), (iii) and (iv), and optionally compound (ii),
- a second step, comprising the reaction of the product of the first step with a compound (v) so that an end-capped (meth)acrylated polyurethane pre-polymer is obtained;
- the dispersion in an aqueous medium of said end-capped (meth)acrylated polyurethane pre-polymer obtained after the second step,
- an optional step comprising the reaction with a neutralizing agent in order to convert the hydrophilic groups provided by compound (iii) into anionic salts,
- an optional step wherein the (meth)acrylated polyurethane pre-polymer obtained after the second step is reacted with a chain extender (vii),
- an optional step comprising the addition of an ethylenically unsaturated compound (B).

If a chain extender (vii) is used, this is preferably added during or after the dispersion of the end-capped (meth) acrylated polyurethane pre-polymer in an aqueous medium. The addition of the ethylenically unsaturated compound (B) can be done after the second step of the reaction. When the ethylenically unsaturated compound (B) is a compound comprising no functional groups which are capable to react with isocyanate groups, the compound can be added before or during the second step of the reaction. According to a preferred embodiment of the invention, the compound (B) is added to the reaction mixture together with compound (v).

According to another preferred embodiment of the invention, part of compound (B) is added to the reaction mixture together with compound (v) and another part of compound (B) is added to the reaction mixture after the second step. In this case, the same or different compounds (B) can be used.

In addition to compound (B) or in replacement of compound (B), non ethylenically unsaturated compounds (C) can also be added before, during or after the second step of the reaction. These compounds (C) are preferably selected from siliconated and/or hydroxylated polyacrylates such as Silclean®3700. The amount of compound (C) is generally between 0 and 30% by weight, preferably between 0 and 10% by weight of compound (C) to the total amount of pre-polymer (A) and optionally compound (B). The composition and process according to the present invention are advantageous in that they are able to provide dispersions with low volatile organic content (VOC), a high solids content, a low viscosity, a low particle size, an excellent stability and a low film formation temperature. Since the "environmental friendly" aspect of a product is becoming an essential added-value today in the market, the elimination of solvents is decreasing the volatile organic content (VOC) and the suppression of amines reduces the odor perception in the coating area and also possible subsequent health injuries. The reduction of skin and eye irritations enhances the safe handling of the product and do not impose the use of a special labelling (Xi) making the product more attractive for the user.

The aqueous dispersions of the invention generally have a total solids content of from about 30 to 50 wt %, preferably from about 35 to 40 wt %; a viscosity measured at 25° C. of 20 to 5000 mPa s, preferably 25 to 200 mPa s, a pH value of 7 to 11, preferably of 7 to 8.5, an average particle size of about 10 to 1000 nm, preferably 50 to 150 nm. The film formation temperature preferably ranges from 0 to 20° C., more preferably from 0 to 5° C.

The compositions according to the present invention are able to provide coatings having no tack even before radiation curing.

The radiation-curable compositions according to the present invention are preferably curable by ultraviolet irradiation, generally in the presence of photoinitiator. They can also be cured by electron-beam irradiation, allowing the use of compositions free of photoinitiator. The compositions according to the invention are providing extremely rapid curing.

The compositions according to the invention show an higher reactivity allowing higher line speed or less irradiative energy curing and increased productivity.

The compositions according to the invention permit to obtain coatings which after radiation curing show an excellent chemical resistance against water, solvents and stains, a superior mechanical resistance against scratch and abrasion—while still being relatively flexible at ambient or low temperature. These coatings also exhibit a good adhesion on porous and non-porous substrates. The optical properties care for good transparency and high gloss.

The coatings obtained from the compositions according to the invention result in selective mechanical properties (harder and softer) and polymer polarity (more hydrophilic or hydrophobic) that allow to cover many different application areas as, for example, coatings for wood, plastic, glass, metal and concrete. The compositions according to the invention are also suitable for making as inks and overprint varnishes. The present invention therefore also relates to the use of the compositions for making inks, varnishes or coatings and to a process for making inks, varnishes or coatings wherein a composition as described here above is used. The present invention also relates to process for preparing a coated article comprising a step wherein the article is coated with a radiation curable composition according to the invention.

The compositions according to the invention are particularly suitable for making coatings for wood furniture and plastic resilient flooring. The compositions according to the invention are also particularly suitable for coating plastic articles, especially 3-dimensional objects made from polyethylene, polypropylene, polycarbonate, optionally pre-coated with other coatings such as polyurethanes.

The compositions according to the invention may therefore also contain different additives such as biocides, stabilizers, thickeners, coalescing agents, antifoam agents, wetting agents, wax and fillers.

The examples which will follow illustrate the invention without limiting it.

EXAMPLE 1

A double-wall glass reactor equipped with a mechanical stirrer, a thermocouple, a vapor condenser and a dropping funnel was charged with 45.3 g of a polyester polyol having an average molecular weight of 670, an hydroxyl number of 167 mg KOH/g and obtained from the polycondensation of neopentylglycol and a mixture of adipic acid and isophtalic acid in a 1:1 weight ratio, 109.2 g of the acrylic acid adduct of bisphenol A diglycidyl ether (BPAAA), 34.3 g of dimethylol propionic acid (DMPA), 231.3 g of 1,1'-methylene bis(4-isocyanato cyclohexane)(H12MDI), 279 g of acetone, 3.1 g of TTNUVIN®622 and 0.6 g of dibutyltinlaurate as a 10% solution in acetone. The reaction mixture was heated until 60° C. under stirring and kept under reflux until the isocyanate content reached a value of 1.09 mcq/g. Then 0.4 g of 4-methoxyphenol dissolved in 207.1 g of DTMPTA, a product comprising a mixture of ditrimethylolpropane triacrylate and ditrimethylolpropane tetraacrylate and having an hydroxyl number of 137 mg KOH/g was added slowly to the reactor and the reaction mixture was kept under reflux until the isocyanate content reached a value of 0.19 mcq/g. Then 209 g of EBECRYL01290, a hexafunctional aliphatic urethaneacrylate, was added to the reaction mixture and stirred until an homogeneous mixture was obtained. This mixture was then cooled down to 45° C. and 25.8 g of triethylamine was added under stirring. The resulting mixture was then added slowly to 1268 g of water at room temperature under high shear agitation until a stable dispersion was obtained. The acetone was stripped off under vacuum at a temperature of 50° C. until its level as measured by gas chromatography was below 0.15%. The polymer dispersion was then cooled down below 30° C. and 2.3 g of a biocide (Acticide®MBS) was added. The dispersion was filtered over a 100µ sieve and its solid content was adjusted to 40% by adding water. The dry content was measured by gravimetric method.

The viscosity of the dispersion was 33 mPa·s (measured at 25° C. with a Brookfield RVT viscometer using spindle N° 1 at 50 rpm).

The average particle size of the aqueous polymer dispersion was 94 nm (measured by laser light scattering using a Malvern Autosizer Particle Analyzer).

The grits content of the dispersion, that is the amount of residue from the polymer dispersion filtered on a 50µ sieve, was lower than 100 mg/liter.

The minimum film formation temperature (MFFT) of the dispersion measured on a gradient-heated metal plate was 0° C.

The colloidal stability was assessed by observing the decantation and/or phase separation on a 200 g sample placed in an oven at 60° C.; it was more than 10 days prior to observable product deterioration. The properties of the dispersion are presented in Table 2 here below.

The composition was then formulated with 1.5% of a photo-initiator (Additol® BCPK) and the viscosity is adjusted to about 1500 mPa·s (Brookfield) using Additol®VXW 6360:water (1:1) up to a maximum of 2%, and evaluated as to its reactivity, scratch resistance, stain resistance, hardness, flexibility and adhesion such as specified here below.

Reactivity: The method covers the minimum UV-dose which is necessary to fully crosslink a coating of 36µ wet applied to a non-porous substrate (white paper, Silico Ultraflat). The coating was dried for 1 minute at 120° C. and then cured under UV-lamp (Hg) of 80 W/cm at different conveyor speeds. The minimum dose is defined by the speed of the conveyer (m/min) that allows a solvent resistance equal or superior to 50 acetone double rubs. The rubs are made with a peace of cotton rag saturated with acetone; one double rub is equal to a forward and backward stroke on the coated surface. The reported number is the number of double rubs required to break through the coating.

Scratch resistance: The method covers the scratch resistance a coating of 36µ wet applied to a non-porous substrate (white paper, Silico Ultraflat). The coating was dried for 10 minute at 35° C. and then cured 2 times under UV-lamp (Hg) of 80 W/cm at a speed of 5 m/min. The scratch is assessed at room temperature using a piece of steel wool attached on a 800 g hammer and rubbed on the coated surface with a forward and backward motion. The reported number is the number of single rubs required to damage the surface and provide a visible loss of gloss due to abrasion.

Stain resistance: The method covers the chemical resistance of a coating of 36µ wet applied to a non-porous substrate (white, 5 mm thick PVC). The coating was dried for 1 minute at 120° C. and then cured under UV-lamp (Hg) of 80 W/cm at 5 m/min. The resistance is assessed by putting a test substance on the coating, covered with a microscope glass and left for 4 hours. The test substances used are tear, black polish, black alcohol pencil, BB750 colorant in water, SR380 colorant in white spirit and SG146 colorant in white spirit. The stains are washed with a couple of rubs using a tissue saturated with isopropanol. The remaining stains are assessed visually using a 1-5 scale, 5=best. A high value (5) is expected to provide the best protection against any household product spillage.

Hardness: The method covers the surface hardness of a coating of 120µ wet applied to glass. The coating was dried for 5 minute at 40° C., then 5 minutes at 80° C. and finally cured 3 times under an UV-lamp (Hg) of 80 W/cm at a speed corresponding to the reactivity. The coated samples are stabilized during 24 hours in a conditioned room (20° C., 50% humidity) and a pendulum hardness (Persoz) is determined in seconds on 3 places of the surface. The mean value is calculated.

Pencil hardness: Pencil hardness (ASTM D-3363), The method covers the hardness of a coating of of 36µ wet applied to polycarbonate sheets. It is used in the industry to determine scratch hardness of coatings. The coating was dried 10 minutes at 40° C. and was cured 2 times under an UV-lamp (Hg) of 80 W/cm at a speed of 2 times 5 m/min.

The coated samples are stabilized during 24 hours in a conditioned room (20° C., 50% humidity). The pencil hardness is determined by scratching the surface of the coating with the pencils using a given force and with a given angle. The hardness is rated from softer to harder in a scale 2B-B-HB-F-H-2H-3H-4H-5H-6H, A high hardness level is whistled to provide an optimum mechanical protection from the coating.

Flexibility: The method covers the flexibility of a coating of 36 g wet applied to a non-porous substrate (white, 5 mm thick PVC). The coating was dried for 1 minute at 120° C. and then cured under UV-lamp (Hg) of 80 W/cm at 5 m/min. The flexibility of the coated PVC can be assessed at room temperature after folding at 90° then at 180°. The defects (cracks, loss of adhesion) are recorded on a 1-5 scale, 5=best. The attributions are 1=severe defects at 90°; 2=moderate defects at 90°; 3=severe defects at 180°; 4=moderate defects at 180°; 5=no defects at 180°. A high value (5) is expected to generate no problem upon manipulation of flexible substrates and is a prerequisite for good temperature & dimensional stability onto rigid substrates.

Water spot: The method covers the water resistance of a coating of 36 g wet applied to a non-porous substrate (white, 5 mm thick PVC). The coating was dried for 1 minute at 120° C. and then cured under UV-lamp (Hg) of 80 W/cm at 5 m/min. The resistance is assessed by cross cutting the coated surface with a knife and putting a drop of water in the middle for a period of 1 hour at room temperature. The water is removed using a dry tissue. The degradation of the surface is assessed visually for whitening or degradation using a 1-5 scale, 5=best. A high value (5) is expected to provide the best protection against water spillage.

Adhesion: The method covers the adhesion of a coating of 36 g wet applied to a non-porous substrate (white, 5 mm thick PVC). The coating was dried for 1 minute at 120° C. and then cured under UV-lamp (Hg) of 80 W/cm at 5 m/min.

5 cuts of ~1 cm and spaced by ~1 mm are made in the coating using a knife, followed by 5 similar cuts in the transversal direction. The adhesion was measured using an adhesive tape firmly pressed on the cross-cut coating and removed rapidly; the damage to the cross-cut surface area of the coating due to adhesion loss is expressed in a 1-5 scale, 5=best. A high adhesion (5) is necessary to ensure a strong permanent bond between the coating and the substrate.

The results obtained are represented in Table 3 here below.

Examples 2 to 5, 7 to 16 and comparative example 6R:

In Examples 2 to 5 and 7 to 16 the process described in Example 1 was repeated except that different quantities and different constituents were used as specified in Table 1 here below. Unless specified otherwise, the amounts of the different compounds are expressed in g.

In Examples 2 to 5, 6R and 7 to 16, the hexafunctional urethaneacrylate EB®1290 was omitted.

In Example 4, DPHA, a mixture of dipentaerythrytol hydroxy pentaacrylate and dipentaerythrytol hexaacrylate, having an hydroxyl number of 67 mg KOH/g, was used instead of DTMPTA In Example 5, DPHA, a mixture of dipentaerythrytol hydroxy pentaacrylate and dipentaerythrytol hexaacrylate, having an hydroxyl number of 67 mg KOH/g, was used instead of DTMPTA and DPHA was also used instead of EBCD1290.

In comparative example 6R, no compound (iv) was used: the acrylic acid adduct of bisphenol A diglycidyl ether (BPAAA) was replaced by 15.4 g of ethylene glycol.

In example 7, PCDL T4691 (Asahi Kasei), a polycarbonate of butane diol: hexane diol (9:1) of average molecular weight of 1000 and having an average hydroxyl number of 110 mg KOH/g, was used instead of the polyester diol.

In example 8, dimethylol propionic acid (DMPA) was replaced by dimethylol butanoic acid (DMBA). The neutralization with triethylamine happens stoichiometrically based on the moles of carboxylic acid.

In example 9, the polyester diol is replaced stoichiometrically by an excess of the acrylic acid adduct of bisphenol A diglycidyl ether (BPAAA).

In example 10, the polyester polyol is replaced by 2-ethyl-2-butyl-1,3-propanediol.

In example 11, the polyester polyol is replaced stoichiometrically by PRIPOL®2033 (Unichema) which is a fatty acid dimer diol composed with 36 carbon atoms and having an average molecular weight of ~600 Daltons and an hydroxyl value of 196-206 mg KOH/g.

In example 12, the diisocyanate (H12MDI) is replaced by a mixture of 199 g H12MDI and 15.4 g of DESMODUR®N3300 (HDI isocyanurate) in a 95:5 molar ratio.

In example 13, neutralization was done with 32.1 g ammonia (110 mole % in comparison with carboxylic acid) in the water phase instead of triethylamine (100 mole % in comparison with carboxylic acid) in the pre-polymer.

In example 14, 24.8 g of IRR154, which is a urethane acrylate based on silicone oil, was added at a level of 5% based on the total weight of the pre-polymer instead of to EBECRYL01290

In example 15, 0.6 g of ADDITOL®HGX83, which is a fluorinated acrylate, was added at a level of 0.1% based on the total weight of the pre-polymer instead of EBECRYL®1290.

In example 16, 6.01 g SILCLEAN®3700, which is a silicone modified hydroxyl-functional polyacrylate of average molecular weight 15000 Daltons supplied as a 25% solution in methoxy propyl acetate, was added at a level of 7% based on the total weight of the pre-polymer instead of EBECRYL01290.

The properties of the compositions are represented in Tables 2 and 3.

|  | Example | | | | | | | | |
| --- | --- | --- | --- | --- | --- | --- | --- | --- | --- |
|  | 1 | 2 | 3 | 4 | 5 | 6R | 7 | 8 | 9 |
| Isocyanate | 231.3 | 283.4 | 289.0 | 192.7 | 192.7 | 340.0 | 198.9 | 210.2 | 217.7 |
| Polyol | 45.3 | 99.3 | 56.6 | 37.8 | 37.8 | 119.2 | 62.7– | 41.2 | — |
| EG | — | — | — | — | — | 15.4 | — | — | — |
| DMPA | 34.3 | 42.0 | 42.8 | 28.6 | 28.6 | 50.4 | 29.5 | — | 32.2 |
| DMBA | — | — | — | — | — | — | — | 34.4 | — |
| BPAAA | 109.2 | 100.3 | 136.5 | 91.0 | 91.0 | — | 93.9 | 99.2 | 135.1 |
| DTMPTA | 207.1 | 258.8 | 275.9 | — | — | 312.6 | — | — | — |
| DPHA | — | — | — | 319.0 | 373.3 | — | 422.6 | 411.4 | 448.8 |
| DPHA | — | — | — | — | 241.1 | — | — | — | — |
| Acetone | 279 | 261 | 267 | 223 | 332 | 280.0 | 269 | 265 | 278 |
| Dibutyltin laurate | 0.6 | 0.7 | 0.7 | 0.5 | 0.5 | 0.7 | 0.5 | 0.5 | 0.5 |
| Tinuvin 622 | 3.1 | 3.9 | 4.0 | 3.3 | 3.6 | 4.2 | 4.0 | 4.0 | 4.2 |
| 4-methoxy phenol | 0.4 | 0.5 | 0.5 | 0.4 | 0.4 | 0.5 | 0.9 | 0.9 | 0.9 |
| Triethylamine | 25.8 | 31.6 | 32.2 | 21.5 | 21.5 | 38 | 22.4 | 26.1 | 24.4 |
| Biocide | 2.3 | 2.3 | 2.3 | 2.8 | 2.8 | 2.4 | 2.3 | 2.3 | 2.4 |
| Deionized water | 1268 | 1476 | 1508 | 1802 | 1802 | 1577 | 1514 | 1493 | 1562 |

|  | Example | | | | | | |
| --- | --- | --- | --- | --- | --- | --- | --- |
|  | 10 | 11 | 12 | 13 | 14 | 15 | 16 |
| Isocyanate | 260.4 | 225.6 | 199.0 + 15.4 | 385.4 | 122.4 | 157.5 | 208.5 |
| Polyol | –46.4 | 19.5– | 40.9 | 75.5 | 24.0 | 30.8 | 40.8 |
| EG | — | — | — | — | — | — | — |
| DMPA | 31.5 | 33.4 | 31.0 | 57.1 | 18.1 | 23.3 | 30.9 |
| DMBA | — | — | — | — | — | — | — |
| BPAAA | 46.7 | 106.5 | 98.7 | 182.0 | 57.8 | 74.3 | 98.4 |
| DTMPTA | — | — | — | — | — | — | — |
| DPHA | 504.9 | 475.0 | 426.4 | 782.0 | 248.4 | 319.5 | 401.0 |

-continued

|  |  |  |  |  |  |  |  |
|---|---|---|---|---|---|---|---|
| DPHA | — | — | — | — | — | — | — |
| Acetone | 297 | 287 | 270 | 494 | 165 | 202 | 280 |
| Dibutyltin laurate | 0.5 | 0.5 | 0.5 | 1.0 | 0.3 | 0.4 | 0.5 |
| Tinuvin 622 | 4.4 | 4.3 | 4.1 | 7.4 | 2.4 | 3.0 | 3.9 |
| 4-methoxy phenol | 1.1 | 1.0 | 1.0 | 1.8 | 0.6 | 0.7 | 0.9 |
| Triethylamine | 23.8 | 25.3 | 23.5 | — | 13.8 | 17.7 | 23.4 |
| Biocide | 2.5 | 2.4 | 2.4 | 4.3 | 1.4 | 1.7 | 2.4 |
| Deionized water | 1666 | 1611 | 1521 | 2778 | 928 | 1136 | 1573 |

TABLE 2

|  | Example | | | | | | | |
|---|---|---|---|---|---|---|---|---|
|  | 1 | 2 | 3 | 4 | 5 | 6R | 7 | 8 |
| Solid content (%) | 40 | 35 | 35 | 35 | 35 | 35 | 35 | 35 |
| pH | 7.1 | 7.6 | 7.2 | 7.1 | 7.7 | 7.5 | 7.4 | 7.4 |
| Viscosity (mPa·s) | 33 | 27 | 23 | 25 | 12 | 50 | 26 | 28 |
| Particle size (nm) | 94 | 65 | 63 | 60 | 271 | 50 | 91 | 63 |
| Acetone (%) | <0.15 | <0.15 | <0.15 | <0.15 | <0.15 | <0.15 | <0.15 | <0.15 |
| Grits (mg/l) | <100 | <100 | <100 | <100 | <100 | <100 | <100 | <100 |
| MFFT (°C.) | 0 | 0 | 0 | 0 | 0 | 0 | 0 | 0 |
| Stability 60°C. (d) | >10 | >10 | >10 | >10 | 10 | >10 | >10 | >10 |
| Acrylates (meq/g) | 3.9 | 3.1 | 3.3 | 5.1 | 6.5 | 2.8 | 5.5 | 5.5 |

|  | Example | | | | | | | |
|---|---|---|---|---|---|---|---|---|
|  | 9 | 10 | 11 | 12 | 13 | 14 | 15 | 16 |
| Solid content (%) | 35 | 35.2 | 34.6 | 34.1 | 35.1 | 35.1 | 35.2 | 34.7 |
| pH | 7.1 | 6.9 | 7 | 6.7 | 6.9 | 7.3 | 7.1 | 7.3 |
| Viscosity (mPa·s) | 23 | 17 | 19 | 21 | 27 | 18 | 23 | 23 |
| Particle size (nm) | 60 | 188 | 131 | 72 | 118 | 186 | 58 | 111 |
| Acetone (%) | <0.15 | <0.15 | <0.15 | <0.15 | <0.15 | <0.15 | <0.15 | <0.15 |
| Grits (mg/l) | <100 | <100 | <100 | <100 | <100 | <100 | <100 | <100 |
| MFFT (°C.) | 0 | 0 | 0 | 0 | 0 | 0 | 0 | 0 |
| Stability 60°C. (d) | >10 | >10 | >10 | >10 | 7 | 5 | >10 | >10 |
| Acrylates (meq/g) | 5.8 | 5.7 | 5.8 | 5.6 | 5.6 | 5.3 | 5.6 | 5.1 |

TABLE 3

|  | Example | | | | | | | | | | | |
|---|---|---|---|---|---|---|---|---|---|---|---|---|
|  | 1 | 2 | 3 | 4 | 5 | 6R | 7 | 8 | 9 | 10 | 11 | 16 |
| Reactivity (m/min) | 40 | 20 | 20 | 45 | 55 | 15 | 45 | 45 | 50 | 45 | 50 | 45 |
| Hardness (s) | 274 | 318 | 331 | 308 | 330 | 207 | 322 | 328 | 325 | 327 | 314 | 348 |
| Pencil hardness |  |  |  | 3-4H |  |  | 3-4H | 4H | 4-5H | 3H | 4H | 3-4H |
| Scratch (rubs) | 20 | 10 | 15 | 30 | 50 | 5 | 30 | 25 | 45 | 20 | 35 | 15 |
| Stains (0-5) | 4.91 | 4.88 | 4.91 | 5.00 | 5.00 | 4.33 | 5 | 5 | 5 | 4.95 | 5 | 5 |
| Flexibility (0-5) | 2 | 4 | 5 | 3 | 4 | 5 | 5 | 5 | 5 | 5 | 5 | 5 |
| Water spot (0-5) |  |  |  | 4 |  |  | 4 | 5 | 5 | 5 | 5 | 5 |
| Adhesion (0-5) | 4.5 | 5 | 2 | 5 | 5 | 4 | 4 | 3 | 5 | 5 | 5 | 5 |

The comparison of Examples 1 to 5 and 7 to 12 with Comparative example 6R show the better performances of the coatings obtained with the compositions according to the invention. Especially comparison of Example 2 with Comparative Example 6R obtained with exactly the same constituents except for the compound (iv) shows the benefit of the compositions according to the invention.

The invention claimed is:

1. An aqueous radiation-curable composition comprising
at least one (meth)acrylated polyurethane pre-polymer (A) obtained from the reaction of:
at least one polyisocyanate compound (i), wherein the amount of the at least one polyisocyanate compound (i) is in the range of from 10 to 60 wt % of the polyurethane prepolymer (A),
optionally, at least one polyol (ii),
at least one hydrophilic compound (iii) containing at least one reactive group capable to react with isocyanate groups and which is capable to render the polyurethane pre-polymer dispersible in aqueous medium either directly or after the reaction with a neutralizing agent to provide a salt,
at least one (meth)acrylated compound (iv) containing at least two reactive groups capable to react with isocyanate groups, wherein the amount of the at least one (meth)acrylated compound (iv) is in the range of from 5 to 30 wt % of the polyurethane prepolymer (A),
at least one (meth)acrylated compound (v) containing essentially at least two (meth)acrylates and only one reactive group capable to react with isocyanate groups selected from poly(meth)acryloyl mono-hydroxy compounds, wherein the amount of the (meth)acrylated compound (v) is in the range of from 10 to 60% by weight of the polyurethane prepolymer (A), and
at least one ethylenically unsaturated compound (B), wherein said composition comprises a total amount of (meth)acrylated and, optionally, polymerizable ethylenically unsaturated groups of at least 3 meq per total weight in g of (i), (ii), (iii), (iv), (v) and (B).

2. The radiation curable composition according to claim 1 obtained by a process comprising
a first step comprising the reaction of compounds (i), (iii) and (iv), and optionally compound (ii),
a second step comprising the reaction of the product of the first step with a compound (v) so that an end-capped (meth)acrylated polyurethane pre-polymer is obtained; the dispersing of said end-capped (meth)acrylated polyurethane pre-polymer obtained after the second step in an aqueous medium,
an optional step comprising the reaction with a neutralizing agent in order to convert the hydrophilic groups provided by compound (iii) into anionic salts, and
a step comprising the addition of an ethylenically unsaturated compound (B).

3. The radiation curable composition according to claim 1, wherein the polyisocyanate (i) is selected from aliphatic and cycloaliphatic polyisocyanates.

4. The radiation curable composition according to claim 1, wherein the polyol (ii) is a polyester polyol having a number average molecular weight of at least 400.

5. The radiation curable composition according to claim 1, wherein the amount of the polyol (ii) is in the range of from 2 to 50 wt % of the polyurethane prepolymer (A).

6. The radiation curable composition according to claim 1, wherein the hydrophilic compound (iii) is selected from hydroxycarboxylic acids represented by the general formula (HO)xR(COOH)y, wherein R represents a straight or branched hydrocarbon residue having 1 to 12 carbon atoms, and x and y independently are integers from 1 to 3.

7. The radiation curable composition according to claim 1, wherein the amount of the hydrophilic compound (iii) is in the range of from 1 to 25 wt % of the polyurethane prepolymer (A).

8. The radiation curable composition according to claim 1, wherein the (meth)acrylated compound (iv) is selected from the reaction products of diglycidyl compounds with (meth)acrylic acid.

9. The radiation curable composition according to claim 8, wherein the (meth)acrylated compound (iv) is the diacrylate ester of bisphenol A diglycidylether.

10. The radiation curable composition according to claim 1, wherein the (meth)acrylated compound (v) is selected from the esterification products of aliphatic and/or aromatic polyols with (meth)acrylic acid having a residual average hydroxyl functionality of about 1.

11. The radiation curable composition according to claim 1, comprising an ethylenically unsaturated compound (B) selected from the esterification products of (meth)acrylic acid with tri-, tetra-, penta and/or hexahydric polyols and their mixtures.

12. The radiation curable composition according to claim 1, comprising the ethylenically unsaturated compound (B) in an amount in the range of between 5 and 50% by weight relative to the total amount of pre-polymer (A).

13. The radiation curable composition according to claim 1, further comprising non-ethylenically unsaturated compounds (C).

14. The radiation curable composition according to claim 13, wherein the amount of the non-ethylenically unsaturated compounds (C) in the range of between 0 and 30% by weight relative to the total amount of pre-polymer (A) and optionally compound (B).

15. The radiation curable composition according to claim 1 wherein said composition comprises a total amount of (meth)acrylated and, optionally, polymerizable ethylenically unsaturated groups of at least 3.5 meq per total weight in g of (i), (ii), (iii), (iv), (v) and (B).

16. The radiation curable composition according to claim 1 wherein said composition comprises a total amount of (meth)acrylated and, optionally, polymerizable ethylenically unsaturated groups of at least 4 meq per total weight in g of (i), (ii), (iii), (iv), (v) and (B).

17. The radiation curable composition according to claim 1 wherein the total amount of (meth)acrylated groups in the pre-polymer (A) is at least 3.0 meq, at least 3.5 meq of (meth)acrylated groups per total weight in g of compounds (i), (ii), (iii), (iv) and (v).

18. The radiation curable composition according to claim 2 which is obtained by a process further comprising a step wherein the (meth)acrylated polyurethane pre-polymer obtained after the second step is reacted with a chain extender (vii), which is an amine.

19. The radiation curable composition according to claim 1 wherein the (meth)acrylated polyurethane pre-polymer (A) is further reacted with at least one chain extender (vii) comprising active amino groups capable of making a chain extension of the remaining isocyanate end-groups of the pre-polymer.

20. The radiation curable composition according to claim 2 obtained by a process further comprising a step of reacting the (meth)acrylated polyurethane pre-polymer obtained after the second step with a chain extender (vii).

21. The radiation curable composition according to claim 1 wherein the (meth)acrylated polyurethane pre-polymer (A) is not further reacted with a chain extender (vii).

* * * * *